United States Patent
Stebnicki et al.

(10) Patent No.: US 6,360,881 B2
(45) Date of Patent: Mar. 26, 2002

(54) FIBER FILLED CHAIN LINK FOR A MODULAR CONVEYER CHAIN

(75) Inventors: James C. Stebnicki, Milwaukee; Peter J. Ensch, Wauwatosa, both of WI (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/777,931

(22) Filed: Feb. 6, 2001

Related U.S. Application Data

(63) Continuation of application No. 09/217,259, filed on Dec. 21, 1998, now Pat. No. 6,247,582.

(51) Int. Cl.$^7$ .............................................. B65G 17/06
(52) U.S. Cl. ....................................... 198/850; 198/853
(58) Field of Search ................................ 198/850, 851, 198/852, 853

(56) References Cited

U.S. PATENT DOCUMENTS

| | | | | |
|---|---|---|---|---|
| 3,602,364 | A | * 8/1971 | Maglio | 198/689.1 |
| 4,123,947 | A | 11/1978 | Smith et al. | 74/245 P |
| 4,167,999 | A | 9/1979 | Haggerty | 198/851 |
| 4,266,661 | A | 5/1981 | Andersson | 198/822 |
| 4,436,200 | A | 3/1984 | Hodlewsky et al. | 198/851 |
| 4,469,221 | A | * 9/1984 | Albert | 198/851 |
| 4,526,637 | A | 7/1985 | Long | 156/137 |
| 4,678,078 | A | 7/1987 | Hastem-Muller | 198/803 |
| 4,705,161 | A | 11/1987 | Gozdiff | 198/847 |
| 4,813,533 | A | 3/1989 | Long | 198/847 |
| 4,858,753 | A | 8/1989 | Hodlewsky | 198/853 |
| 4,863,418 | A | 9/1989 | Fillar et al. | 474/207 |
| 4,893,709 | A | 1/1990 | Schroeder et al. | 198/852 |
| 4,899,872 | A | 2/1990 | Hokao | 198/840 |
| 4,932,927 | A | 6/1990 | Fillar | 474/207 |
| 5,054,609 | A | 10/1991 | Poerink | 198/852 |
| 5,137,144 | A | 8/1992 | Uehara | 198/822 |
| 5,168,981 | A | 12/1992 | Ruff | 198/850 |
| 5,215,185 | A | 6/1993 | Counter et al. | 198/853 |
| 5,215,616 | A | 6/1993 | Fillar | 156/173 |
| 5,310,047 | A | 5/1994 | Ledingham | 198/841 |
| 5,402,880 | A | 4/1995 | Murphy | 198/852 |
| 5,575,937 | A | 11/1996 | Haase | 249/119 |
| 5,586,644 | A | 12/1996 | Coen et al. | 198/853 |
| 5,609,243 | A | 3/1997 | Fujita et al. | 198/847 |
| 6,161,685 | A | * 12/2000 | Stebnicki | 198/852 |
| 6,247,582 | B1 | * 6/2001 | Stebnicki et al. | 198/853 X |
| 6,250,458 | B1 | * 6/2001 | Shibayama et al. | 198/851 |

FOREIGN PATENT DOCUMENTS

| | | | | |
|---|---|---|---|---|
| NL | 1008069 | 7/1999 | | B65G/17/08 |
| WO | WO9528343 | 10/1995 | | B65G/17/40 |

OTHER PUBLICATIONS

DuPont, Zytel nylon resin and Minlon engineering thermoplastic resin, Design Handbook For DuPont Engineering Plastics, Module II.
Ticona, Celstran, Long Fiber Reinforced Thermoplastics, Hoechst, Ticona—A member of the Hoechst Group, 1998.

\* cited by examiner

*Primary Examiner*—James R. Bidwell
(74) *Attorney, Agent, or Firm*—Quarles & Brady LLP

(57) ABSTRACT

A modular chain link for use in constructing a modular conveyer chain. The modular chain link includes a plurality of link ends which are adapted to intermesh with link ends on a similar adjacent link. The link ends include openings which are substantially axially aligned with openings on the adjacent link ends. The openings are adapted to receive a connecting pin for pivotally joining the adjacent modular chain links together. The modular chain link is injection molded from a polymer and comprises less than about 30 weight percent of filler in order to maximize the mechanical properties of the modular chain link.

9 Claims, 2 Drawing Sheets

FIBER FILLED CHAIN LINK FOR A MODULAR CONVEYER CHAIN

CROSS REFERENCES TO RELATED APPLICATIONS

This application is a continuation of U.S. patent application Ser. No. 09/217,259 filed on Dec. 21, 1998, U.S. Pat. No. 6,247,582.

BACKGROUND OF THE INVENTION

This invention relates to a modular conveyer chain, and more particularly to an improved chain link for use in construction of a modular conveyer chain.

Manufacturing and production facilities utilize modular conveyer chains to transport products or articles of production from one location to another. Conventional modular conveyor chains are typically comprised of multiple thermoplastic chain links or modules. The links making up the modular conveyer chain typically have a plurality of spaced link ends which intermesh with complementary spaced link ends projecting from a link or links in an adjacent row. The individual chain links are usually similar in width and may be arranged in a bricked configuration. The intermeshing link ends are joined or hinged together by a connecting pin that permits the adjacent chain links to pivot with respect to each other.

The chain links are typically joined together to form an endless conveyor chain that is usually driven by a drive sprocket. The modular conveyor chains are subjected to tensile forces that tend to separate the individual chain links when the chain is placed under a load.

Conventional chain links are typically made of thermoplastic (e.g. acetal, polyester, nylon and polypropylene). The choice of the polymer used for the chain link usually depends on the physical properties which are desired (i.e. high tensile strength, high fatigue strength, low friction, chemical resistance and/or suitability for use under extreme cyclic temperatures) in the chain link. The tensile strength and fatigue strength of the chain link are especially important because a chain link having these increased mechanical properties increases the overall tensile strength of the modular conveyor chain and reduces chain stretch due to loading.

Modular conveyer chains are often used to carry goods from one location to another location where the temperature of the environment at the two locations is significantly different. The individual chain links expand as the temperature of the chain increases, and contract as the temperature of the chain decreases. As the individual chain links expand or contract, the overall length of the conveyer chain varies significantly as a result of a high coefficient of thermal expansion that is commonly associated with most thermoplastics.

A typical application where a modular conveyor belt is subject to extreme cyclic temperatures is in a conveyor chain used to transport cans or bottles through pasteurizers in breweries. The high temperatures in a pasteurizer combined with the slow movement of the cans or bottles through the pasteurizer when the chain is under a tensile load may cause the chain to stretch such that the bottom canteary section of an endless conveyer chain sags. This chain stretching may also effect the performance of the interaction between the drive sprocket and chain links. In addition, in double deck conveyer systems, the sagging can become so great that the bottom canteary section of the top conveyor of an endless conveyer chain interferes with bottles located on a lower conveyor chain.

One known method for increasing the tensile strength and the fatigue strength of the overall modular conveyor chain is to use metal links in combination with the thermoplastic chain links. The combination of thermoplastic links and metal links causes the loads on the modular conveyer to be carried primarily by the metal links. One of the problems associated with combining links made from two different materials to form a modular conveyor is that there are significant bending stresses generated within the thermoplastic chain links due to the differences in the modulus of elasticity, coefficient of friction and coefficient of thermal expansion between the thermoplastic chain links and the metal chain links.

Plastics manufacturers have increased the tensile strength of thermoplastics by adding filler to the polymer as the raw polymer is being manufactured. The filler is typically in the form of long fibers. Manufacturers of long fiber reinforced thermoplastics, such as Ticona and DuPont, provide technical literature to their customers which indicates that increasing the amount of filler within the raw polymer increases the tensile strength of the molded polymer. The technical literature also provides results for tensile tests performed on different thermoplastics where the percentage of filler within the polymer varies. The tests were performed in accordance with ASTM standards and indicate that the tensile strength of the thermoplastics increases as the weight percent of filler within the raw polymer increases. The technical literature shows test results for polymers that include up to 60 weight percent filler within the polymer.

SUMMARY OF THE INVENTION

The present invention is an improved chain link for use in constructing a modular conveyor chain. The chain link includes a plurality of spaced link ends that extend from the body of the chain link. The link ends are adapted to intermesh with complementary spaced link ends projecting from a link or links in an adjacent row. The link ends include openings which are axially aligned and adapted to receive a connecting pin that runs through the openings to pivotally connect the link with an adjacent chain link or links. The chain link is molded from a thermoplastic material that includes a filler, preferably glass fiber, which improves the mechanical properties of the chain link. The amount of filler within the molded thermoplastic material should maximize the fatigue strength and tensile strength of the molded chain link in environments where the temperature can vary significantly. The chain link comprises less than about 30 weight percent of filler based on the weight of the molded chain link; and preferably between the range of about 5 to 25 weight percent; and more preferably between the range of about 10 to 20 weight percent. The filler is preferably in the form of long strands which have a length between 0.125 inches and 0.5 inches.

The modular chain link is preferably injection molded from a strong base polymer in order to provide ample strength and corrosion resistance to the chain link. In addition, the links are preferably molded in a die having a relatively high temperature because during molding a layer consisting of unfilled polymer forms near the surface of the link and increasing the temperature of the die causes the layer to be thicker. Positioning the fibers as far as possible from the surface of the link is crucial because the fibers can be very abrasive and during operation of the modular conveyor chain there is commonly point contact between the connecting pins and the internal edges of the link ends. The point contact results in a significant amount of relative motion between the connecting pins and link ends. This type of motion can cause extreme wear, especially when the abrasive fibers are near the outer surface of the links. Increased wear reduces the operating life of the modular conveyor chain.

During conventional injection molding as hot liquid elastomer material flows around an obstruction in the mold (e.g., a core pin), two flow fronts having a partially solidified skin surface meet. Where the skin surfaces meet a less homogenous blend of polymer is formed. The areas where the surfaces meet are conventionally referred to as weld lines or flow lines. The mechanical properties of the molded chain link at these weld lines are significantly degraded, especially the tensile strength, stiffness, fatigue strength and impact resistance.

The orientation of the fibers within the molded chain link can be manipulated by locating the gates which supply liquid polymer into the molding die in a particular configuration. The gates on the molding die are preferably located such that the fibers are oriented within the chain link in substantially the same direction as the direction of the travel of the modular conveyor chain. Orienting the fibers within the modular chain link in the direction of chain travel significantly increases the tensile strength and the fatigue strength of a modular conveyor chain that is assembled from the individual chain links.

An object of this invention is to provide a chain link for use in constructing a modular conveyor chain that has a low friction surface, high tensile strength, high fatigue strength, minimal coefficient of thermal expansion and a more stable modulus of elasticity as the operating temperature increases. Increasing the strength of thermoplastic modular conveyor chains is critical because many conveyor applications require a high strength conveyor chain.

Another object of this invention is to provide a chain link for use in constructing a modular conveyor chain that has increased fatigue strength and tensile strength over a range of operating temperatures. Increasing the useful range of operating temperatures where a modular conveyor chain can function effectively allows the chain to be used in a greater number of applications.

A further object of this invention is to provide a chain link for use in constructing a modular conveyor chain that is more effective in the types of applications where modular conveyor chains are typically used. Modular conveyor chains are typically used in pasteurizers, bottle and can warmers, industrial microwave ovens, shrink wrap tunnels and freezers.

Yet another object of the invention is to provide a modular conveyor chain that will resist stretching due to mechanical loading in a variety of environmental conditions including high temperatures and corrosive environments.

Other features and advantages of the invention will become apparent to those skilled in the art upon review of the following detailed description, claims and drawings.

DETAILED DESCRIPTION OF THE DRAWINGS

Figure 1:
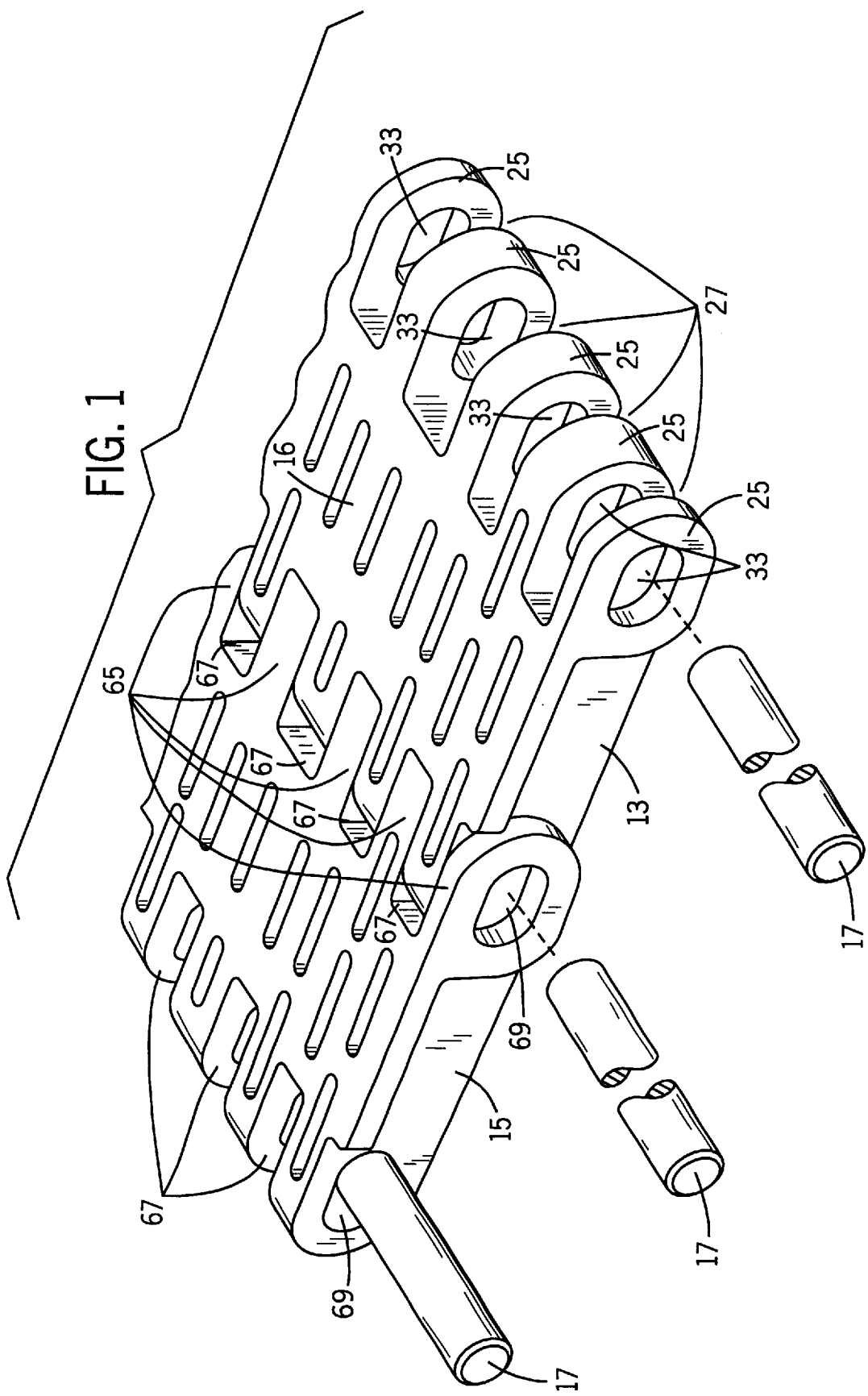
FIG. 1 is a partially exploded perspective view of a portion of a modular conveyor chain.

Conventional modular conveyor chains include several rows of thermoplastic modular chain links. A portion of a typical modular conveyor chain is shown in FIG. 1. A modular chain link 13 embodying the present invention is shown intermeshed with a substantially identical adjacent chain link 15. A connector pin 17 pivotally connects the chain link 13 with the adjacent chain link 15.

The chain link 13 typically comprises a link body 16 that includes a series of link ends 25 extending from opposite sides of the link body 16. The link ends 25 are transversely spaced from each other to define therebetween a series of spaces 27. The series of link ends 25 include openings 33 that are axially aligned with respect to each other. The openings 33 in the link ends 25 can be cylindrical or elongated in the direction of travel of the modular conveyor belt.

The adjacent chain link 15 is preferably the same shape as the chain link 13. The adjacent chain link 15 also includes a series of link ends 65 that are axially spaced from each other to define a series of spaces 67. The series of spaces 67 are adapted to receive the series of link ends 25 located on one side of the chain link 13. The link ends 65 extend into the spaces 27 between the link ends 25 of the chain link 13. The link ends 65 in the adjacent link 15 also include openings 69 that are axially aligned with respect to each other as well as the openings 33 in chain link 13 when the adjacent link 15 is assembled to the chain link 13. The openings 69 may be cylindrical or elongated in the travel direction of the modular conveyor chain.

Figure 2:
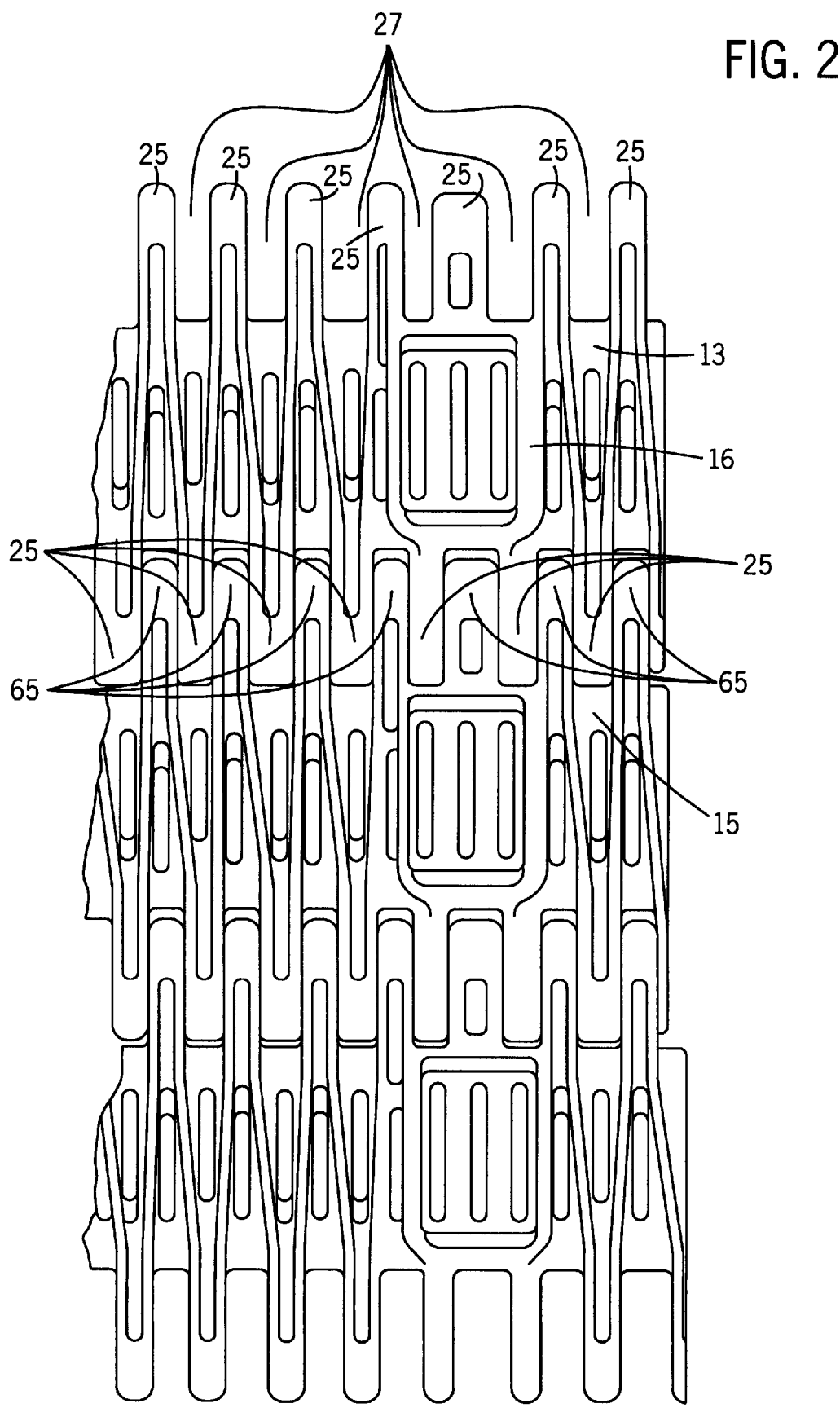
FIG. 2 is a bottom plan view of a portion of the modular conveyor chain of FIG. 1.

The modular chain links can take any conventional shape. A conventional link shape is shown FIGS. 1 and 2. Other typical chain link configurations are described and illustrated in U.S. Pat. Nos. 5,335,768 and 5,215,185, both of which are assigned to the assignee of the present invention.

The chain link of the present invention is comprised of an injection molded polymer having a filler material added to the polymer to increase strength and other properties of the polymer. In a preferred form of the invention the link 13 includes less than about 30 weight percent of filler based on the weight of the molded chained link; and preferably between the range of about 5 to 25 weight percent; and more preferably between the range of about 10 to 20 weight percent.

As stated previously, the filler used is preferably in the form of glass fibers, although stainless steel, aramide and carbon fibers may also be used. The fibers are preferably one-eighth to one-half inches long and oriented within the molded chain link in predominantly the same direction as the direction of travel of the modular conveyor chain. The direction of travel of the chain is denoted as X (see FIG. 2).

In one preferred form of the invention the base polymer of the chain link is molded from acetal. In other arrangements the chain link could be molded from other moldable polymer materials used for molding chain links.

The technical literature published by the plastics manufacturers contradicts the claimed percentages. The literature includes test results for tests performed according to ASTM standards which indicate that the tensile strength of a filled polymer product increases as the weight percent of the filler material within the plastic increases. However, this is not the case when filled polymer is used to mold modular conveyor links for use in constructing a modular conveyor chain. As stated previously, the mechanical properties of the chain links improve when the chain link comprises less than about 30 weight percent of filler based on the weight of the molded chain link; and preferably between the range of about 5 to 25 weight percent; and more preferably between the range of about 10 to 20 weight percent. Maximizing the desirable mechanical properties of the chain links increases the overall strength of the modular conveyor chain.

Determining the effectiveness of using thermoplastic chain links that have less than 30 weight percent of filler was done by tensile testing chain links where the weight percent of the filler within the links varied from one test chain to another.

Each test chain included seven chain links that were six inches wide. The chain links were assembled using connecting pins that were cut to seven inches long. The links were molded from Celstran® polypropylene filled with long glass fiber produced by Ticona of Winona, Minn., and the pins used were one-quarter inch diameter pultruded PBT rod. Three different test chains were tested at each temperature (70° F., 140° F. and 180° F.) in order to determine an average value.

The test was done by inserting one test chain into the pull test fixture and the other two test chains on the floor of the test chamber. All three test chains were held at 70° F. for at least one hour before testing the first test chain. After testing the first test chain, the next preheated test chain was secured and held at 70° F. for about 15 minutes before testing. Once the second test was complete, the final test chain was secured and held at 70° F. for about 15 minutes before testing. This testing process was repeated for test chains at 140° F. and 180° F. The results of these tests are provided below.

|  | Average Ultimate Tensile Strength (lb) | | |
| --- | --- | --- | --- |
| Material | 70° F. | 140° F. | 180° F. |
| 0% Glass | 2410 | 1380 | 995 |
| 5% Glass | 3010 | 2065 | 1815 |
| 10% Glass | 3135 | 2355 | 1935 |
| 20% Glass | 3185 | 2335 | 1890 |
| 30% Glass | 2705 | 2010 | 1640 |

There is also typically a correlation between the tensile strength of a material and the fatigue strength of a material. When the material has a high tensile strength, the material also typically has a high fatigue strength. Therefore, based on the tensile tests performed by plastics manufacturers according to the ASTM standards, the fatigue strength of modular conveyor links should be higher when the links are molded from thermoplastics that include a higher weight percent of filler (at least up to 60 weight percent according to published technical literature). However, fatigue testing done using modular conveyor links molded from filled polymer having less than 30 weight percent filler demonstrates that the fatigue strength (in addition to the tensile strength) of modular chain links is greater when the chain links are molded from a polymer that has less than 30 weight percent filler.

The fatigue tests were performed on test chains that included 15 chain links. The chain links were assembled using connecting pins that were cut to 7 inches long. The links were molded from Ticona's Celstran® long glass reinforced polypropylene, and the pins used were one-quarter inch diameter pultruded PBT rod. The pins used to connect the adjacent chain links were retained by using push nuts on the ends of the pins. The tests were done at different load levels on thermoplastic test chains where the weight percent of filler within the molded chain links has varied for each load level. One test chain was analyzed at each load level for each of the different weight percentages of filler that were tested. The fatigue failure values are shown in the table below.

| Load | Cycles to Failure | | | |
| --- | --- | --- | --- | --- |
| (Lb) | 5% | 10% | 20% | 30% |
| 2000 | 6250 | 8230 | 10700 | 1500 |
| 1500 | 112400 | 110700 | 83500 | 33900 |
| 1000 | 897000 | 1182000 | 66700 | 437000 |
| 800 | — | — | — | 912000 |

The present invention is not limited to the embodiments shown and described above, alternate embodiments will be apparent to those skilled in the art and are within the intended scope of the present invention. In particular, it will be apparent to one skilled in the art to utilize chain links of different configurations. Therefore, the invention should be limited only by the following claims.

What is claimed is:

1. A modular chain link for use in constructing a modular conveyor chain wherein said chain link includes a plurality of spaced link ends projecting from opposite sides of a main body of the chain link, said plurality of spaced link ends being adapted to couple with adjacent links for joining the modular chain link together with the adjacent links, said modular chain link is injection molded from a polymer including a fibrous filler material which increases the tensile strength of said link, said filler material being less than about 30 weight percent of the molded chain link.

2. The modular chain link of claim 1 wherein the polymer is selected from the group consisting of polyamide, acrylonitrile-butadiene-styrene, polypropylene, polyphenylene sulfide, polyurethane, polyketone, acetal and polyethylene.

3. The modular chain link of claim 1 wherein the filler material is selected from the group consisting of glass fiber, carbon fiber, aramide and stainless steel.

4. The modular chain link of claim 1 wherein said filler material is between about 5 and 25 weight percent of said molded chain link.

5. The modular chain link of claim 1 wherein said filler material is between about 10 and 20 weight percent of said molded chain link.

6. The modular chain link of claim 1 wherein said filler material is in the form of long fibers.

7. The modular chain link of claim 6 wherein said fibers have a length between 0.125 inches and 0.5 inches.

8. The modular chain link of claim 1 wherein a layer of unfilled polymer is formed adjacent an exterior surface of said link.

9. The modular chain link of claim 8, in which said layer of unfilled polymer is formed adjacent said exterior surface by increasing the temperature of a portion of the die molding said link, wherein the portion of the die is adjacent said exterior surface of the molded link.

* * * * *